UNITED STATES PATENT OFFICE.

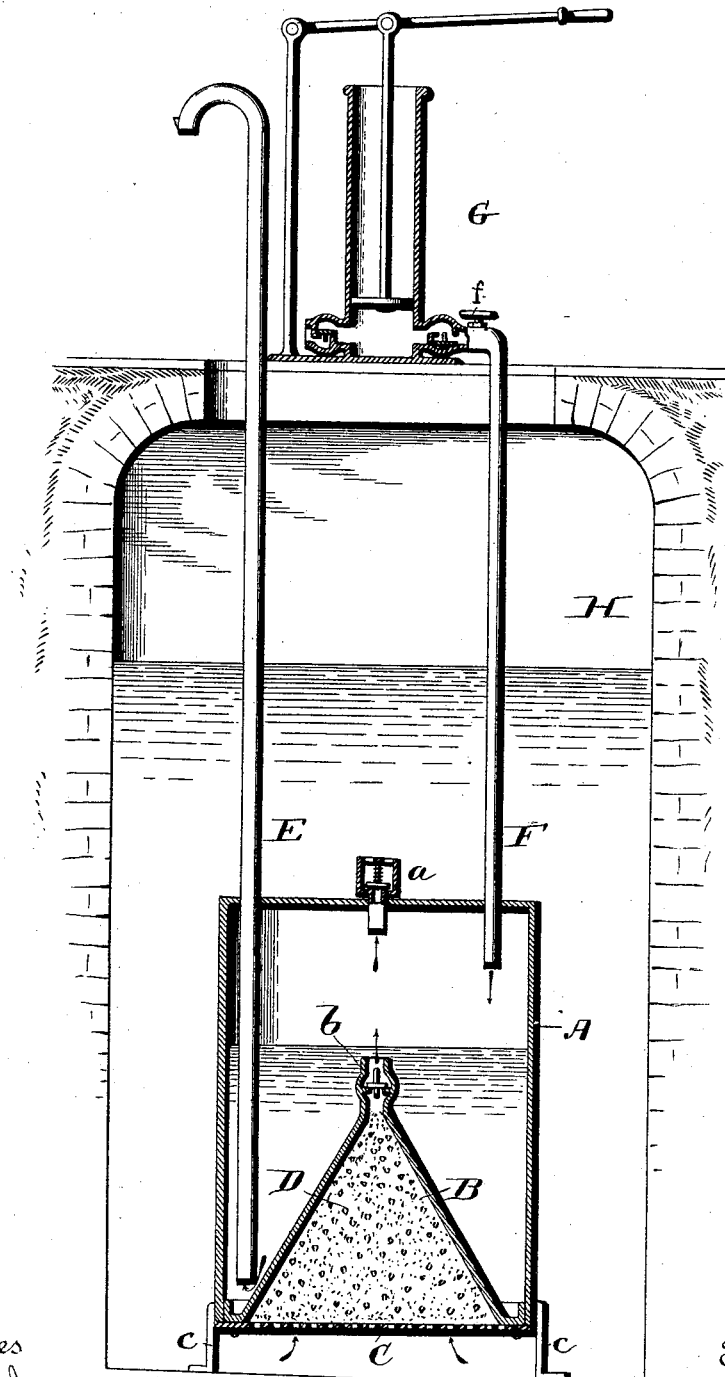

JAMES M. WASSON, OF PEORIA, ILLINOIS.

FILTER.

SPECIFICATION forming part of Letters Patent No. 481,606, dated August 30, 1892.

Application filed March 18, 1892. Serial No. 425,436. (No model.)

*To all whom it may concern:*

Be it known that I, JAMES M. WASSON, a citizen of the United States, residing at Peoria, in the county of Peoria and State of Illinois, have invented a new and useful Improvement in Water-Filters, of which the following is a specification.

My invention relates to submerged water-filters; and it has for its object the construction of an apparatus that will aerate and filter water in cisterns.

The drawing shows a vertical sectional elevation of the apparatus and the cistern of water.

A is a cylindrical tank with a tight-fitting top and a removable perforated bottom C, upon which rests a bottomless conical filter-case B, into which open all the perforations in the bottom plate C. On the apex of this conical filter-case is a vertical check-valve $b$, opening upward. In the space between the plate C and the valve $b$ is placed the filter-filling D, of charcoal, sand, gravel, or other suitable material.

E is the outlet-pipe, leading from the surface of the ground, extending into the tank A, and ending near its bottom.

F is an air-pipe, having its lower end extending through the top of the tank A and ending a short distance below said top. Its upper end is connected at the surface with an ordinary air-compressing pump G, and is provided with a valve $f$, by means of which the tank A may be relieved of air-pressure when desired.

The tank A is placed in a cistern H, being submerged below the water-line, as shown. In the top of the tank is an upward-opening spring safety-valve $a$, adjusted to open at a pressure just in excess of that required to force the water to the surface through the pipe E. The bottom of the tank is supported a short distance above the bottom of the cistern by suitable legs $c\ c$.

The operation is as follows: The tank being empty, the water in the cistern will flow up through the perforations in the bottom plate C and thence through the filtering material D, where it will be filtered. Then, raising the valve $b$, the purified water will flow into the tank A. When air is forced into the tank A through the pipe F by the air-compressor G, the valve $b$ closes and the filtered water in the tank is forced out through the outlet-pipe E. The air is always forced into the tank A under greater pressure than is necessary to raise the filtered water to the surface. Consequently the valve $a$ will open and allow the excess of air to escape into the water of the cistern, thus aerating and oxygenating it. When the tank is emptied, the water in the cistern flows through the filter, opens the valve $b$, and again fills the tank with filtered water. If the entire contents of tank A is not removed at each pumping operation, the relief-valve $f$, near the top of pipe F, may be opened and the air released from the tank A, thereby permitting the water in the cistern to again fill the tank. To renew or cleanse the filter the apparatus may be drawn to the surface, the perforated plate C removed, and the filtering material taken out, washed, and returned.

Having thus described my invention, what I claim as new, and desire to secure by Letters Patent, is—

In a submerged water-filter, a tank having a closed top with a valved opening therein and a perforated bottom plate, a filter-case packed with filtering material resting on said bottom plate and having a valved opening in its top, an air-compressor, an air-pipe connected with the compressor and extending into the tank, and a discharge-pipe in communication with the tank.

In testimony that I claim the foregoing as my own I have hereto affixed my signature in presence of two witnesses.

JAMES M. WASSON.

Witnesses:
R. D. MORGAN,
H. STEELE.